(12) United States Patent
Yamamoto et al.

(10) Patent No.: US 6,967,469 B2
(45) Date of Patent: Nov. 22, 2005

(54) BATTERY CHARGING METHOD, BATTERY CHARGING CIRCUIT, AND PORTABLE ELECTRONIC DEVICE HAVING A BATTERY

(75) Inventors: Isao Yamamoto, Kyoto (JP); Tetsuro Hashimoto, Kyoto (JP); Hiroyuki Ishikawa, Kyoto (JP); Shigekane Matsui, Kyoto (JP)

(73) Assignee: Rohm Co, Ltd., Kyoto (JP)

( * ) Notice: Subject to any disclaimer, the term of this patent is extended or adjusted under 35 U.S.C. 154(b) by 159 days.

(21) Appl. No.: 10/703,639

(22) Filed: Nov. 6, 2003

(65) Prior Publication Data

US 2004/0095095 A1    May 20, 2004

(30) Foreign Application Priority Data

Nov. 8, 2002  (JP)  ............... 2002-325337

(51) Int. Cl.⁷ ........................ H01M 10/44; H01M 10/46
(52) U.S. Cl. ...................................................... 320/137
(58) Field of Search ............................... 320/125, 127, 320/132, 137, 140, 160

(56) References Cited

U.S. PATENT DOCUMENTS 3,668,418 A * 6/1972 Godard ........................ 307/66

6,476,585 B1 * 11/2002 Simmonds ................. 320/162

FOREIGN PATENT DOCUMENTS

JP         8-106926        4/1996

* cited by examiner

Primary Examiner—Edward H. Tso
(74) Attorney, Agent, or Firm—Hamre, Schumann, Mueller & Larson, P.C.

(57) ABSTRACT

A battery is charged by using in series a constant-voltage DC power supply with current limit function and a constant voltage circuit which has a differential comparator circuit and whose current limit value is variable. Following a period of charging with the current of current limit value by the constant-voltage DC power supply, a period is provided in correspondence with the state of charging of the battery, for charging with a current limit value of the constant voltage circuit which is smaller than that current limit value. The detection of the charging state of the battery is effected by a comparison between a current value of a current source of a differential comparator circuit and a differential output of that differential comparator circuit. It enables to reduce electric power consumed by the control transistor of the constant voltage circuit and to reduce the allowable loss required for the control transistor.

6 Claims, 4 Drawing Sheets

(1) 275mW (2) 450mW (3) 120mW (4) 450mW (4)' 900mW

BATTERY CHARGING METHOD, BATTERY CHARGING CIRCUIT, AND PORTABLE ELECTRONIC DEVICE HAVING A BATTERY

BACKGROUND OF THE INVENTION

1. Field of the Invention

The present invention relates to a charging method and a charging circuit for charging a rechargeable secondary battery such as a lithium ion battery, as well as a portable electronic apparatus having the battery or the charging circuit.

2. Description of the Related Art

Secondary batteries, such as lithium ion batteries, which excel in the charging characteristic and are rechargeable are widely used in portable electronic devices including portable telephones, personal handy phone (PHS) terminals, personal digital assistants (PDAs), and personal computers.

Conventionally, in the portable electronic devices using a lithium ion battery as the secondary battery, charging based on constant current control is effected in an initial period of charging, and charging based on constant voltage control is effected in a latter period thereof (e.g., refer to JP-A-8-106926).

This conventional portable electronic device is provided with a constant-current controlling circuit for effecting constant current control and a constant-voltage control circuit for effecting constant voltage control, a DC voltage from an AC adapter being supplied to these circuits. In the initial state of charging, a constant-current controlling transistor of the constant-current controlling circuit is first controlled, and the battery is charged by a constant current. When the battery voltage rises to a predetermined value by this constant current charge, the constant current control is changed over to constant voltage control based on the constant-voltage control circuit, whereupon the battery is charged by a constant voltage by controlling the constant-voltage controlling transistor. When charging is effected up to a rated voltage, charging control is finished.

JP-A-8-106926 is known as a related art.

However, with conventional method of charging control, if the constant current value in constant current control is suppressed to a low level in conformity with the characteristic of the initial charging current of the battery, a long time is required for charging. In addition, if a changeover from constant current charge to constant voltage charge is effected speedily, the charging time can be shortened, but a current greater than a value allowed at that point of time flows due to the difference with the charging voltage of the battery from the point of time of the changeover.

In addition, since the constant-current and constant-voltage controlling transistors function as series regulators, a large heat loss occurs due to the product of a charging current and a differential voltage between the DC voltage from the adapter and the battery voltage. To withstand this heat loss, a control transistor exhibiting greater allowable dissipation must be used.

SUMMARY OF THE INVENTION

Accordingly, an object of the invention is to provide a battery charging method and a battery charging circuit which uses an adapter as a constant-voltage DC power supply with a current limit function, and charges the battery by using a constant voltage circuit whose current limit value is variable, and which, by effecting a change in the current limit value at an appropriate timing, is capable of shortening the battery charging time, of positively reducing electric power consumed by the control transistor of the constant voltage circuit, and of making small the allowable loss required for the control transistor, as well as well as a portable electronic device having the battery and the charging circuit.

The invention provides a battery charging method of charging a battery comprising the steps of: charging a battery from a DC power supply which is subjected to current limit with a power-supply limiting current value Ilim and is subject to constant voltage control with a first voltage V1, by a charging current of the power-supply limiting current value Ilim through a constant-voltage control unit which has a differential comparator circuit and whose current limit value is variable, wherein said constant-voltage control unit performs current limit with a first current value Icl3 larger than the power-supply limiting current value Ilim and constant voltage control with a second voltage V2 lower than the first voltage V1; making differential comparison between a charging voltage Vbat of said battery and a reference voltage Vref1 corresponding to the second voltage V2 with said differential comparator circuit; generating a differential comparison output Smod, which is different from a constant-voltage control signal Scv, from said differential comparator circuit when the charging voltage Vbat rises from a level lower than the reference voltage Vref1 and said differential comparator circuit becomes a state of effecting linear operation; and changing the current limit value from the first current value Icl3 to a second current value Icl4 smaller than the power-supply limiting current value Ilim in response to the differential comparison output Smod.

Furthermore, the differential comparison output Smod is generated by a comparison between a current value associated with a current value I0 of a current source 41 used in said differential comparator circuit and one current I1 based on the differential comparison.

The invention provides a battery charging circuit which performs current limit with a power-supply limiting current value Ilim and to which electric power is supplied from a DC power supply which is subjected to constant voltage control with a first voltage V1, comprising: a control transistor 22 which is provided in a charging path to a battery and which is controlled by a constant-voltage control signal Scv; a constant-voltage control circuit 40 in which a differential comparison is made between a voltage proportional to a charging voltage Vbat of said battery and a reference voltage Vref1 with a differential comparator circuit using a current source 41, wherein said constant-voltage control circuit 40 outputs the constant-voltage control signal Scv so that the charging voltage Vbat becomes a second voltage V2 lower than the first voltage V1, and generates a differential comparison output Smod according to one said current I1 of the differential comparison; and a current-limit-signal generating circuit 50 for making a comparison between a charging current of said battery and a current limit value whose setting is variable and which is set to a first current value Icl3 larger than the power-supply limiting current value Ilim, and for suppressing the constant-voltage control signal Scv when the charging current exceeds the current limit value, wherein the current limit value is changed from the first current value Icl3 to a second current value Icl4 smaller than the power-supply limiting current value Ilim when a differential comparison signal Smod is generated from said constant-voltage control circuit 40.

Furthermore, said constant-voltage control circuit 40 compares a signal proportional to a current of said current source 41 with a signal proportional to the current I1 based on the differential comparison and generates the differential comparison output Smod.

Furthermore, an offset is provided to at least one of the signal proportional to the current of said current source 41 and the signal proportional to the current I2 based on the differential comparison.

The invention provides a portable electronic device comprising: a rechargeable battery and the battery charging circuit descried above.

DETAILED DESCRIPTION OF THE PREFERRED EMBODIMENTS

Referring now to the accompanying drawings, a description will be given of the battery charging method, the battery charging circuit, and the portable electronic device having the battery in accordance with the invention.

Figure 1:
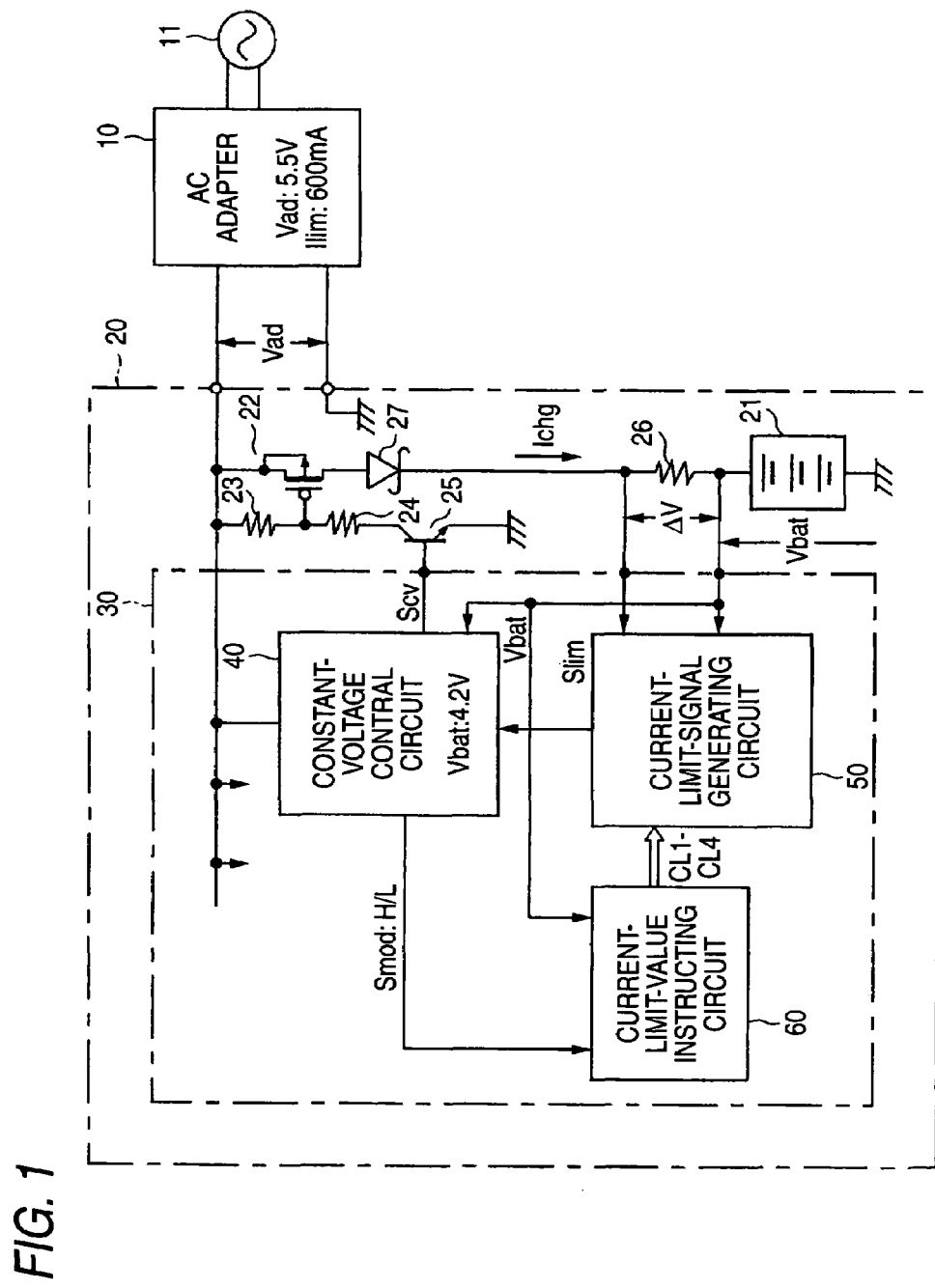
FIG. 1 is an overall block diagram in accordance with an embodiment of the invention.
Figure 2:
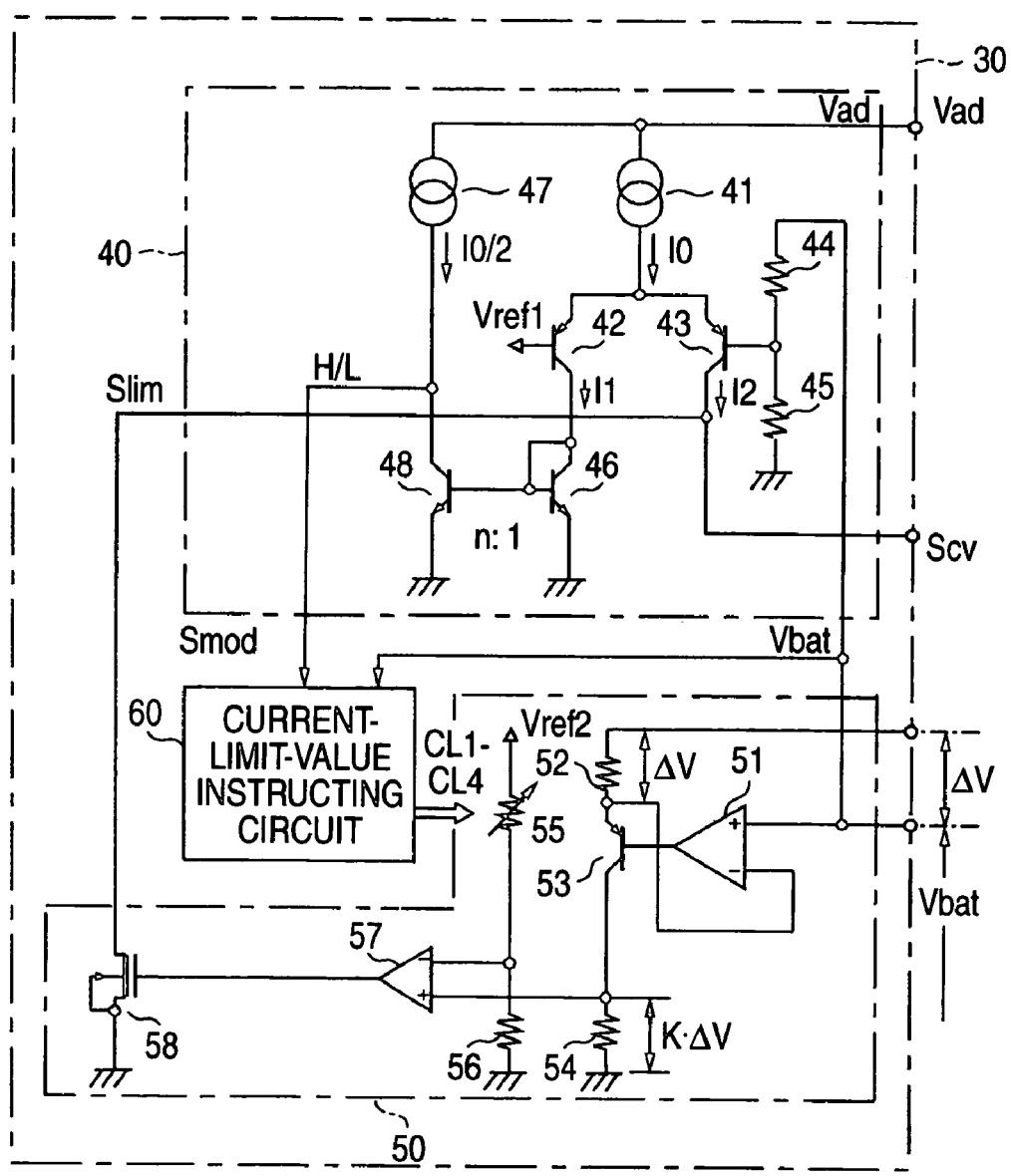
FIG. 2 is a block diagram of a constant-voltage control circuit and a current-limit-signal generating circuit shown in FIG. 1.
Figure 3:
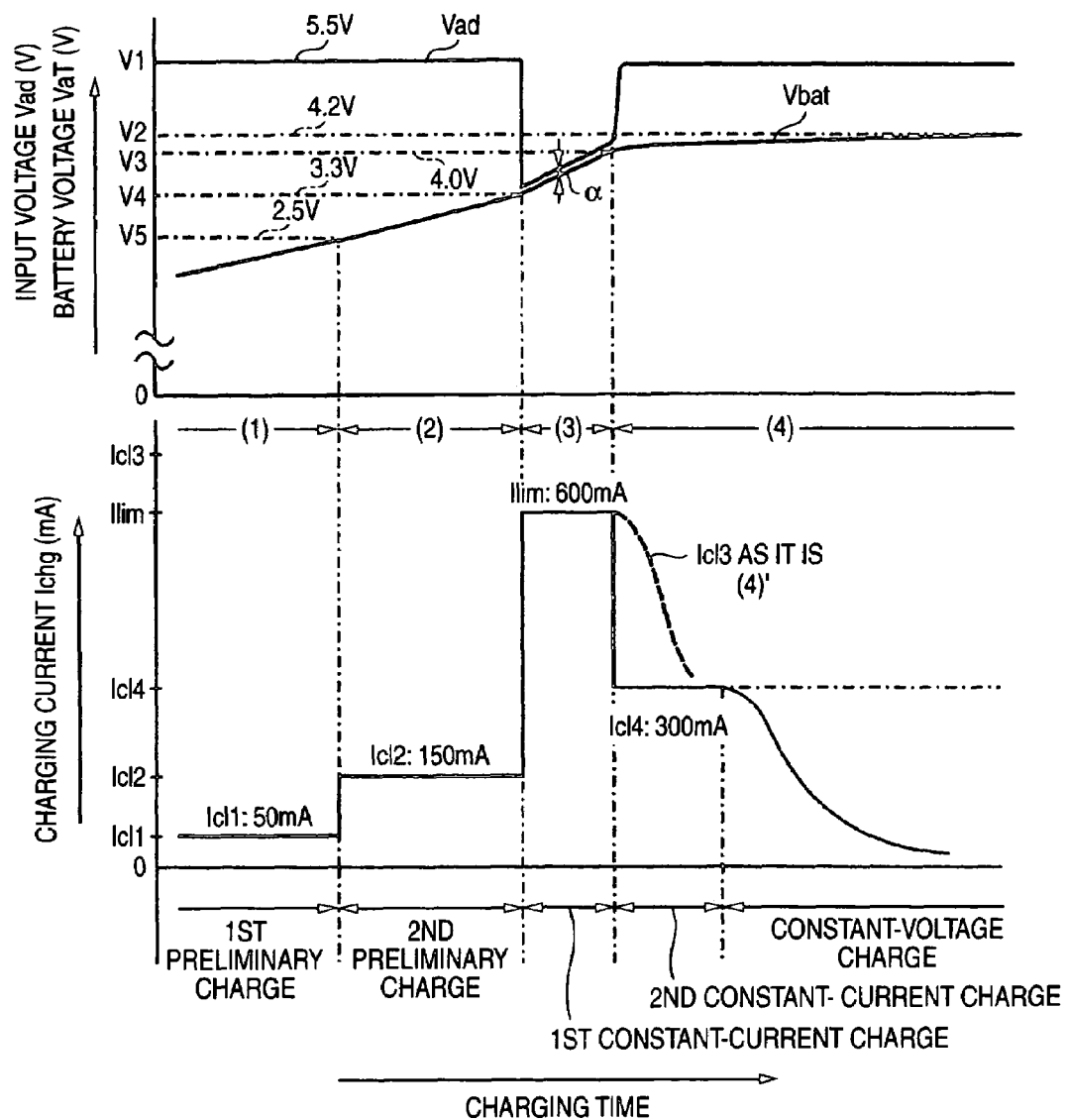
FIG. 3 is a diagram illustrating of an input voltage, a charging voltage, and a charging current of a battery with the lapse of time.
Figure 4:
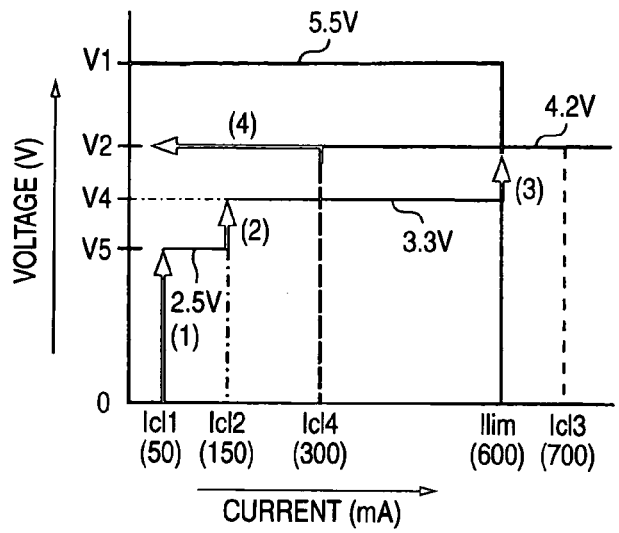
FIG. 4 is a diagram explaining changes in the charging state of the battery by using control characteristics.

FIG. 1 is an overall block diagram of an AC adapter 10 and a portable electronic device 20 having a battery and a battery charging circuit in accordance with an embodiment of the invention. FIG. 2 is a diagram illustrating specific circuits of a constant-voltage control circuit 40 and a current-limit-signal generating circuit 50 in accordance with the invention. FIG. 3 is a diagram illustrating the charging state of the battery with respect to an input voltage, a battery voltage (i.e., charging voltage), and a charging current with respect to the charging time. FIG. 4 is a diagram explaining changes in the charging state of the battery by using the characteristic of a DC power supply (i.e., the AC adapter) for limiting the current with an adapter limiting current value Ilim and effecting constant voltage control by a first voltage V1, as well as the characteristic of a constant-voltage controlling unit for effecting constant voltage control by a second voltage V2 lower than the first voltage V1. In addition, FIGS. 5A to 5E are diagrams schematically illustrating the loss of a control transistor at the time of each state.

In FIG. 1, the AC adapter 10 converts AC power from a commercial AC power supply 11, and outputs a predetermined adapter output DC voltage Vad as the first voltage V1 (e.g., 5.5 V), and its output current is subjected to be current-limited at the adapter limiting current value Ilim (e.g., 600 mA).

The DC voltage Vad from the AC adapter 10 is supplied to the portable electronic device 20 such as a portable telephone. This DC voltage Vad is supplied to a lithium ion battery 21 through a PMOS transistor 22 which is a control transistor. A diode 27 which is inserted in series is provided for preventing a reverse current, and a Schottky barrier diode whose forward drop voltage is small is suitable. In addition, a resistor 26 which is inserted in series is a low-resistance resistor for detecting the charging current. The terminal voltage at the battery 21 as a charge voltage Vbat and a voltage drop portion of the current detecting resistor 26 as a drop voltage ΔV are respectively supplied to a charge control IC chip 30. Further, resistors 23 and 24 and an NPN transistor 25 are for controlling the degree of conduction of the control transistor 22 by receiving a constant-voltage control signal Scv.

The charge control IC chip 30 includes the constant-voltage control circuit 40, the current-limit-signal generating circuit 50, and a current-limit-value instructing circuit 60. The constant-voltage control circuit 40 makes a differential comparison between the battery voltage Vbat and an internal first reference voltage Vref1, and generates the constant-voltage control signal Scv so as to charge the battery voltage Vbat to the predetermined second voltage V2 (e.g., 4.2 V). In addition, when the battery voltage Vbat rises gradually from a low voltage and has reached a third voltage (e.g., 4.0 V) slightly lower than the second voltage V2, the constant-voltage control circuit 40 generates a differential comparison output Smod, and supplies it to the current-limit-value instructing circuit 60.

The current-limit-value instructing circuit 60 is formed by a logic circuit. In addition to the differential comparison output Smod, the battery voltage Vbat is inputted to the current-limit-value instructing circuit 60. In correspondence with these inputs, the current-limit-value instructing circuit 60 generates first to fourth limiting-current command values CL1 to CL4 for such as a first preliminary charge current value Icl1 (e.g., 50 mA), a second preliminary charge current value Icl2 (e.g., 150 mA), a first current value Icl3 (e.g., 700 mA), and a second current value Icl4 (e.g., 300 mA), and supplies them to the current-limit-signal generating circuit 50. It should be noted that the first current value Icl3 is sufficient if it is greater than the adapter limiting current value Ilim, and it may be infinitely large in an extremely case.

The current-limit-signal generating circuit 50 makes a comparison between the drop voltage ΔV and the limiting-current command values CL1 to CL4 at that point of time, and when the drop voltage ΔV has reached the limiting-current command values CL1 to CL4, the current-limit-signal generating circuit 50 generates a current limit signal Slim, supplies it to the constant-voltage control circuit 40 to suppress the constant-voltage control signal Scv. As a result, a charging current Ichg is limited to a value corresponding to the limiting-current command values CL1 to CL4.

It should be noted that the DC voltage Vad is used as the working power supply for the constant-voltage control circuit 40, the current-limit-signal generating circuit 50, and the current-limit-value instructing circuit 60. The Schottky barrier diode 27 prevents the power from being supplied to the respective circuits when the adapter 60 is removed from the portable electronic device 20.

In FIG. 2, in the constant-voltage control circuit 40, a differential comparator circuit is formed by a first constant current source 41 for supplying a constant current value I0 as well as a differential transistor pair of a first differential transistor 42, which is a PNP transistor to the base of which the first reference voltage Vref1 (e.g., 1.2 V) is applied, and a second differential transistor 43, which is a PNP transistor to the base of which a detecting voltage obtained by dividing the battery voltage Vbat is applied. When the battery voltage Vbat of the battery 21 is at a predetermined second voltage V2 (e.g., 4.2 V), a detecting voltage equal to the first reference voltage Vref1 is applied to the base of the second differential transistor 43 of this differential transistor pair. The resistance values of voltage dividing resistors 44 and 45 are set in such a manner.

The output of the second differential transistor 43 serves as the constant-voltage control signal Scv. Meanwhile, the output of the first differential transistor 42 is supplied to an NPN transistor 46 whose collector and base are connected together and which is an input side of a current mirror circuit. In addition, a constant current source 47 for supplying a constant current value IO/2 and an NPN transistor 48 whose base is connected to the base of the NPN transistor 46 and which is an output side of the current mirror circuit are connected in series. The differential comparison output Smod is outputted from their node.

In this constant-voltage control circuit 40, when the base voltages of the differential transistors 42 and 43 of the differential transistor pair are equal (Vbat=V2), the respective currents I1 and I2 becomes equal (I1=I2= I0/2). However, when the battery voltage Vbat is low and the base voltage of the second differential transistor 43 is lower than the base voltage of the first differential transistor 42, the second differential transistor 43 is completely conducting, and its current I2 is large (I2= I0). At this time, the first differential transistor 42 and the input/output-side transistors 46 and 48 of the current mirror circuit are completely non-conducting (I1= 0), and the differential comparison output is at high (H) level.

When the battery voltage Vbat gradually becomes high and reaches the third voltage V3 (e.g., 4.0 V) or thereabouts which is close to the second voltage V2, the transistors 42 and 43 of the differential transistor pair enter a region of linear operation. The linear operation referred to herein means a state of operation in which one of the first and second differential transistors 42 and 43 extricates itself from complete conduction and the other one extricates itself from complete non-conduction, and the current IO of the current source 41 is branched to the two differential transistors 42 and 43.

As the transistors 42 and 43 enter the region of linear operation, the constant current I0 of the current source 41 is distributed to the two transistors 42 and 43 as the currents I1 and I2 in correspondence with their states of operation. Only when the current I1 of the first differential transistor 42 flows, the output-side transistor 48 of the mirror circuit conducts, whereupon the differential comparison output Smod becomes a low (L) level.

In addition, an offset can be imparted to values of operation by providing a predetermined ratio (1:n) to such as the sizes of the input/output-side transistors 46 and 48 of the current mirror circuit. It should be noted that this offset can also be imparted by varying the current value of the second constant current source 47.

The third voltage V3 at which the two transistors 42 and 43 of this differential transistor pair enter the region of linear operation is set so as to correspond to the battery voltage Vbat at the point of time when a shift takes place from the state of current limit operation in the AC adapter 10 to the state of constant voltage operation in the constant-voltage control circuit 40 or at a point of time immediately before then.

In FIG. 2, in the current-limit-signal generating circuit 50, the lower potential of the drop voltage ΔV is inputted to a non-inverted input terminal (+) of an operational amplifier 51, while the upper potential of the drop voltage ΔV is connected to ground through a resistor 52, a PNP transistor 53, and a resistor 54. Further, the potential at a node of the resistor 52 and the PNP transistor 53 is inputted to an inverted input terminal (−) of the operational amplifier 51. As a result, a predetermined voltage k·ΔV (k is a coefficient) proportional to the drop voltage ΔV is generated in the resistor 54. If resistance values of the resistor 52 and the resistor 54 are made equal, the coefficient k is 1.

Meanwhile, a resistor 56 and a variable resistor 55 whose resistance value is varied by the first to fourth limiting-current command values CL1 to CL4 from the current-limit-value instructing circuit 60 in accordance with the command values CL1 to CL4 are connected in series between the second reference voltage Vref2 and the ground. As a result, a voltage corresponding to the command values CL1 to CL4 is generated in the resistor 56.

A comparator 57 makes a comparison between the voltage (i.e., the drop voltage ΔV) of the resistor 54 and the voltage (i.e., command values CL1 to CL4) of the resistor 56, and when the drop voltage ΔV exceeds the command value persisting at that time, its output is inverted to the H level. An NMOS transistor 58 to the gate of which the output of this comparator 57 is applied is connected between the collector of the second differential transistor 43 and the ground. As a result, when the output of the comparator 57 becomes the H level, the constant-voltage control signal Scv is suppressed, thereby effecting current limit.

Referring to FIGS. 3 to 5 as well, a description will be given of the charging operation in accordance with the invention which is configured as described above. In the invention, the charging operation of the battery is effected in accordance with characteristics of the AC adapter 10 which limits the current with the adapter limiting current value Ilim (600 mA) and provides constant voltage control by the first voltage V1 (5.5 V), as well as characteristics of the constant-voltage controlling unit within the portable electronic device which provides constant voltage control by the second voltage V2 (4.2 V) lower than the first voltage V1 and limits the current with various current values.

In the charging of the battery, in a case where the battery voltage Vbat is a low value, the current-limit-value instructing circuit 60 outputs the first command value CL1 (=50 mA) since the battery voltage Vbat is smaller than or equal to a fifth voltage V5 (=2.5 V). During this first preliminary charge period (1), the drop voltage ΔV due to the charging current Ichg is compared with the command value CL1, and the current limit signal Slim as a result of that comparison is supplied to the constant-voltage control circuit 40, and suppresses the constant-voltage control signal Scv. Consequently, the constant-voltage control circuit 40 controls the control transistor 22 so that the charging current Ichg is limited to the first preliminary current value Icl1. During the first preliminary charge period (1), the first preliminary current value Icl1 flows, and the battery voltage Vbat gradually rises toward the fifth voltage V5 (=2.5 V).

Figure 5A:
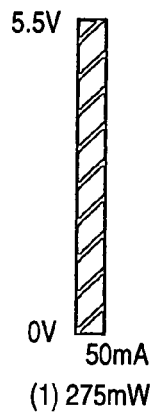
FIGS. 5A to 5E are diagrams schematically illustrating the loss of a control transistor at the time of each state.

During this charging period (1), since the AC adapter 10 is not subjected to current limit, the first voltage V1 is supplied to the portable electronic device 20. The differential voltage (V1−Vbat) between the first voltage V1 and the battery voltage Vbat is applied in a dispersed manner to the control transistor 22, the Schottky barrier diode 27, and the current detecting resistor 26. If the voltages applied to the Schottky barrier diode 27 and the current detecting resistor 26 are ignored for the sake of simplicity since they are small, electric power consumed by the control transistor 22 becomes the product of the differential voltage (V1−Vbat) and the first preliminary charge current value Icl1, and even when it is largest, the value of power consumption of the Schottky barrier diode 27 becomes 275 mW as shown in FIG. 5A.

When the battery voltage Vbat reaches the fifth voltage V5, the current-limit-value instructing circuit 60 outputs the second command value CL2 (=150 mA). During this second preliminary charge period (2), the constant-voltage control circuit 40 controls the control transistor 22 so that the charging current Ichg is limited to the second preliminary current value Icl2. The second preliminary current value Icl2 flows in the battery 21, and the battery voltage Vbat gradually rises toward a fourth voltage V4 (3.3 V).

Figure 5B:
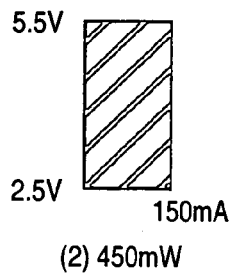

During this charging period (2), since the AC adapter 10 is still not subjected to current limit, the first voltage V1 is supplied to the portable electronic device 20. If a calculation is made in the same way as the charging period (1), electric power consumed by the control transistor 22 becomes the product of the differential voltage (V1–Vbat) and the second preliminary charge current value Icl2, and even when it is largest, the value of power consumption becomes 450 mW as shown in FIG. 5B.

When the battery voltage Vbat reaches the fourth voltage V4, the preliminary charge periods (1) and (2) of the battery 21 are completed. Subsequently, it shifts to a first constant-current charge period (3) when charging is effected with a greater current value. The shift to this first constant-current charge period (3) is effected when the current-limit-value instructing circuit 60 outputs a third command value CL3 (=700 mA) upon detecting that the battery voltage Vbat has reached the fourth voltage V4.

It should be noted that when, at the time of starting the charging of the battery, the battery voltage Vbat had not dropped so much and is not less than the fifth voltage V5 or not less than the fourth voltage V4, the first preliminary charge or the first and second preliminary charge is naturally not effected.

During the first constant-current charge period (3), the third command value CL3 is set to be larger than the adapter limiting current value Ilim which is the current limit value of the AC adapter 10, and the battery voltage Vbat has not reached the second voltage V2 at which the constant-voltage control circuit 40 effects the constant voltage operation. For these reasons, the current limit operation with the adapter limiting current value Ilim functions in the AC adapter 10. In addition, the control transistor 22 is in a completely conducting state.

When the current limit operation is effected by the AC adapter 10, its DC voltage Vad becomes a voltage in which a voltage α, which is a total of a voltage drop portion due to the on resistance of the control transistor 22, a voltage drop portion of the Schottky barrier diode 27, and a voltage drop portion of the current detecting resistor 26, is added to the battery voltage Vbat. Accordingly, the DC voltage Vad rises with a rise of the battery voltage Vbat due to the charging with the adapter limiting current value Ilim.

Figure 5C:
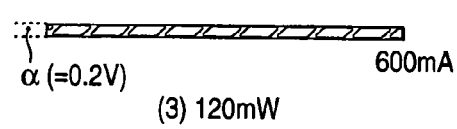

During the first constant-current charge period (3), if the voltage α is 0.2 V and even if it is assumed that all of it is applied to the control transistor 22, the power consumed by the control transistor 22 becomes the product of the voltage α and the adapter limiting current value Ilim, and is merely 120 mW as shown in FIG. 5C.

Now, when the charging proceeds during the first constant-current charge period (3), and the battery voltage Vbat approaches the third voltage V3 (approx. 4.0 V) slightly lower than the second voltage V2, the first and second differential transistors 42 and 43 of the differential pair enter the region of linear operation. During the period before entering the region of linear operation when the battery voltage Vbat is low, the first differential transistor 42 is in a cutoff state, whereas the second differential transistor 43 is in a completely conducting state, so that all the constant current I0 of the current source 41 flows to the second differential transistor 43 (I2=I0).

When the first and second differential transistors 42 and 43 enter the region of linear operation, the constant current I0 of the current source 41 is distributed to the two differential transistors 42 and 43 as the currents I1 and I2 in correspondence with the respective base potentials of the two differential transistors. The current I1 of the first differential transistor 42 flows to the input-side transistor 46 of the current mirror circuit, and the operation is effected so as to allow a current corresponding to its current mirror ratio (n:1) to flow to its output-side transistor 48.

While the current flowing across the output-side transistor 48 is zero, the potential at the node with the constant current source 47, i.e., the differential comparison output Smod, is constantly at the H level. When the current flows across the output-side transistor 48, the differential comparison output Smod is inverted to the L level.

Upon detecting that the differential comparison output Smod has been set to the L level, the current-limit-value instructing circuit 60 changes the command value from the third command value CL3 (700 mA) to the fourth command value CL4 (300 mA). As a result of this change to the command value CL4, the current limit signal Slim is imparted from the current-limit-signal generating circuit 50 to the constant-voltage control circuit 40, allowing the control transistor 22 to effect current limit operation with the second current value Icl4 (300 mA). Consequently, a second constant-current charge period (4) is started. At this time, as for the AC adapter 10, its current limit operation is canceled, and its DC voltage Vad is reset to the first voltage V1.

In the invention, the detection of the point of time of changeover from the first constant-current charge period (3) to the second constant-current charge period (4) is effected on the basis of a change in the state of operation of the differential comparator circuit for effecting constant voltage control. Accordingly, it is possible to accurately detect the point of time when constant voltage control is effected by the constant-voltage control circuit 40 or a point of time immediately before then.

Figure 5D:
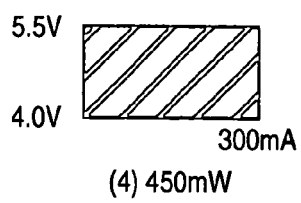

During this charging period (4), the AC adapter 10 is not subjected to current limit, so that the first voltage V1 is supplied to the portable electronic device 20. If a calculation is made in the same way as the charging periods (1) and (2), electric power consumed by the control transistor 22 becomes the product of the differential voltage (V1–Vbat) and the second current value Icl4, and even when it is largest, the value of power consumption becomes 450 mW as shown in FIG. 5D. This is the same power consumption as during the charging period (2).

It should be noted that when charging further proceeds while the second constant-current charge is being effected during the charging period (4), and when the charging current Ichg has become smaller than the second current value Icl4, constant-voltage charge control is effected automatically.

Incidentally, as charging control of the battery 21 itself, since the first preliminary charge, the second preliminary charge, and the first constant-current charge are consecutively effected, it is unnecessary to provide the second constant-current charge period (4) in which the charging current Ichg is made small as in the invention.

Figure 5E:
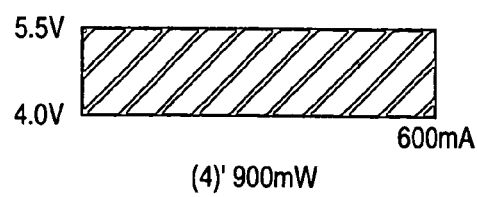

However, if consideration is given of the case in which this second constant-current charge is not effected (this case is set to be a period (4)'), when the first constant-current charge period (3) has been completed and the operation has shifted to constant voltage control by the constant-voltage control circuit 40, a current (approx. 600 mA) whose value is substantially the same as the value persisting until then flows as the charging current Ichg. At the same time, since the AC adapter 10 is not subjected to current limit, the DC voltage Vad of the AC adapter 10 becomes the first voltage V1 (see the characteristic indicated by the broken line in FIG. 3). Accordingly, during the period (4)', power consumption (approx. 900 mW), which is the product of the current (approx. 600 mA) and the differential voltage (V1−Vbat) between the first voltage V1 and the battery voltage Vbat, occurs in the control transistor 22 as a loss, as shown in FIG. 5E.

The loss in this period (4)' is large in comparison with the losses occurring in the other periods (1) and (2), and can possibly result in the breakdown of the control transistor 22. To avoid this breakdown, a control transistor 22 exhibiting greater allowable dissipation would have to be used. In the invention, such a problem is overcome, and the effect is particularly large in the charging of a high-capacity battery using a large charging current as in the illustrated case.

In addition, from the viewpoint of shortening the charging time and preventing the breakdown of the control transistor 22, it is required that the changeover from the third charging period (3) to the fourth charging period (4) be effected at the point of time when constant current charge by the AC adapter 10 has been completed and the operation has shifted to constant voltage control by the constant-voltage control circuit 40 or at a point of time immediately before then.

It is difficult to accurately detect the timing of changeover by merely detecting the battery voltage and the charging current Ichg. In the invention, the point of time of shifting from constant current charge to constant voltage control or a point of time immediately before then can be detected accurately and by the use of minimum additional circuitry by making use of the situation of a change in the state of operation of the current differential circuit for effecting constant voltage control.

In accordance with the description of the invention, the battery is charged by using in series the constant-voltage DC power supply with a current limit function and the constant voltage circuit whose current limit value is variable. Following a period of charging with the current of a current limit value by the constant-voltage DC power supply with the current limit function, a period is provided in correspondence with the state of charging of the battery, for charging with a current limit value of the constant voltage circuit which is set to be smaller than that current limit value. As a result, it is possible to shorten the battery charging time, and make small the allowable loss required for the control transistor of the constant voltage circuit.

In addition, the detection of the charging state of the battery for making the current limit value of the constant voltage circuit smaller than the current limit value of the constant-voltage DC power supply is effected by a comparison between a current value of the current source of the differential comparator circuit and a differential output of that differential comparator circuit. As a result, it is possible to prevent the effect of shortening the charging time from being diminished, and positively reduce electric power consumed by the control transistor of the constant voltage circuit.

What is claimed is:

1. A battery charging method of charging a battery, comprising the steps of:
    charging a battery from a DC power supply which is subjected to current limit with a power-supply limiting current value and is subject to constant voltage control with a first voltage, by a charging current of said power-supply limiting current value through a constant-voltage control unit which has a differential comparator circuit and whose current limit value is variable, wherein said constant-voltage control unit performs current limit with a first current value larger than the power-supply limiting current value and constant voltage control with a second voltage lower than said first voltage;
    making differential comparison between a charging voltage of said battery and a reference voltage corresponding to the second voltage with said differential comparator circuit;
    generating a differential comparison output, which is different from a constant-voltage control signal, from said differential comparator circuit when said charging voltage rises from a level lower than said reference voltage and said differential comparator circuit becomes a state of effecting linear operation; and
    changing said current limit value from said first current value to a second current value smaller than said power-supply limiting current value in response to said differential comparison output.

2. The battery charging method according to claim 1, wherein said differential comparison output is generated by a comparison between a current value associated with a current value of a current source used in said differential comparator circuit and one current based on said differential comparison.

3. A battery charging circuit which performs current limit with a power-supply limiting current value and to which electric power is supplied from a DC power supply which is subjected to constant voltage control with a first voltage, comprising:
    a control transistor which is provided in a charging path to a battery and which is controlled by a constant-voltage control signal;
    a constant-voltage control circuit in which a differential comparison is made between a voltage proportional to a charging voltage of said battery and a reference voltage with a differential comparator circuit using a current source, wherein said constant-voltage control circuit outputs said constant-voltage control signal so that said charging voltage becomes a second voltage lower than said first voltage, and generates a differential comparison output according to one said current of the differential comparison; and
    a current-limit-signal generating circuit for making a comparison between a charging current of said battery and a current limit value whose setting is variable and which is set to a first current value larger than said power-supply limiting current value, and for suppressing said constant-voltage control signal when said charging current exceeds said current limit value,
    wherein said current limit value is changed from said first current value to a second current value smaller than said power-supply limiting current value when a differential comparison signal is generated from said constant-voltage control circuit.

4. The battery charging circuit according to claim 3, wherein said constant-voltage control circuit compares a signal proportional to a current of said current source with a signal proportional to the current based on said differential comparison and generates said differential comparison output.

5. The battery charging circuit according to claim 4, wherein an offset is provided to at least one of the signal proportional to the current of said current source and the signal proportional to the current based on said differential comparison.

6. A portable electronic device comprising: a rechargeable battery and the battery charging circuit according to claim 3.

* * * * *